Patented July 2, 1935

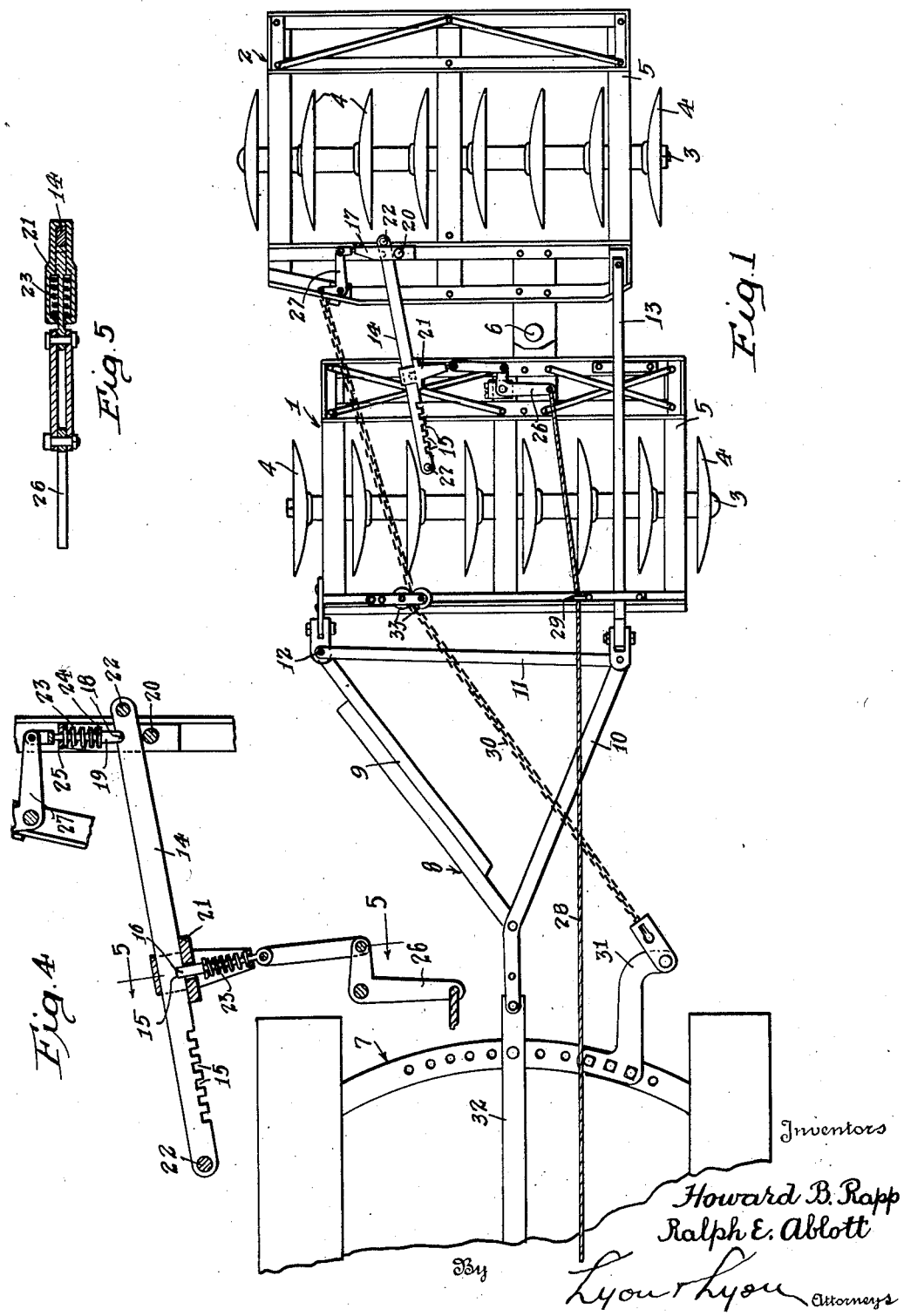

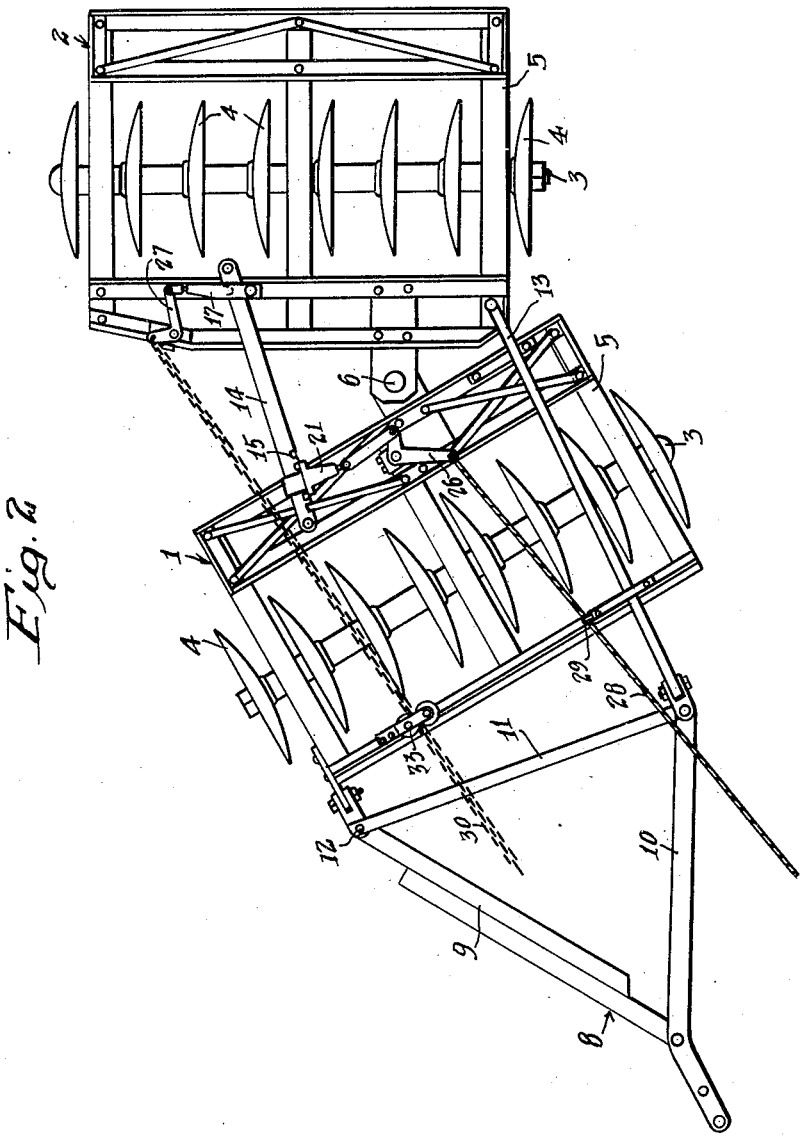

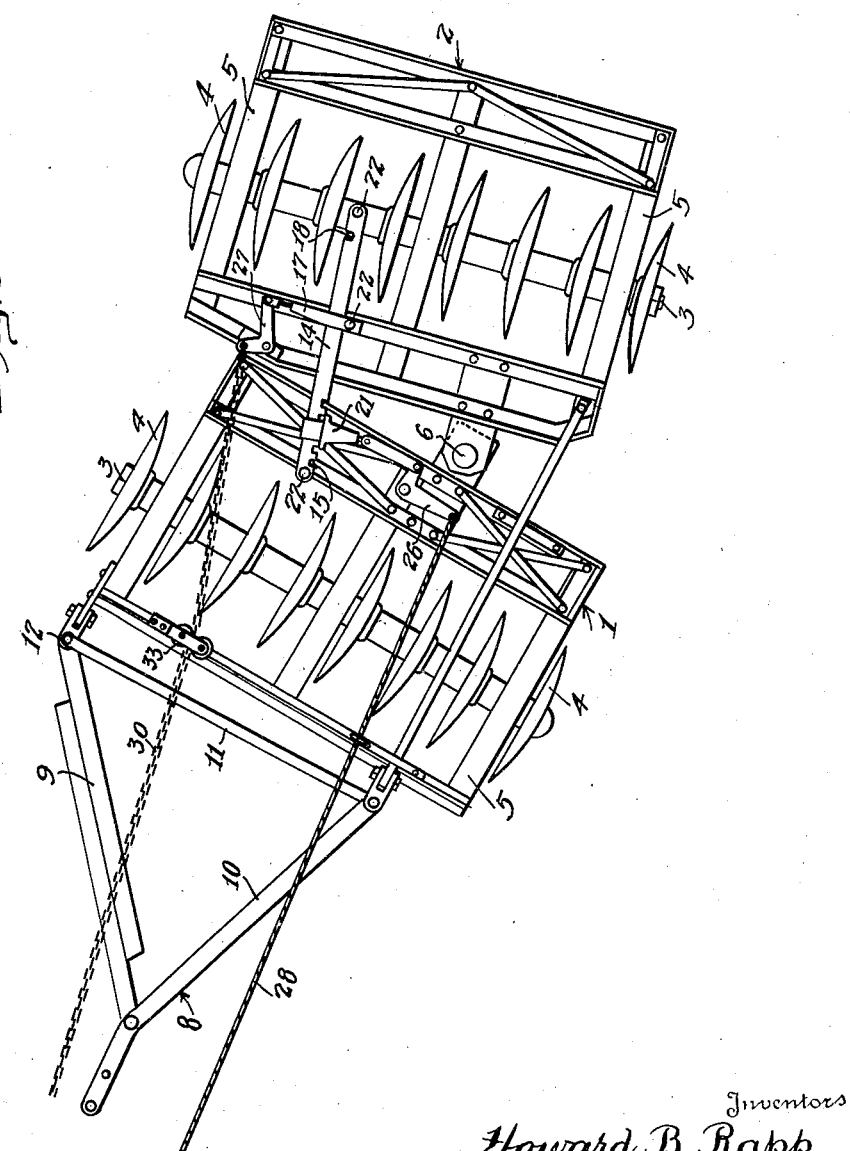

2,007,062

REISSUED

UNITED STATES PATENT OFFICE 2,007,062

DISK HARROW

Howard B. Rapp and Ralph E. Ablett, Santa Ana, Calif., assignors to said Howard B. Rapp, Santa Ana, Calif., and Truman C. Rapp, Los Angeles, Calif.

Application September 4, 1934, Serial No. 742,590

7 Claims. (Cl. 55—83)

This invention relates to disk harrows, and more particularly to a disk harrow of the single tandem offset type.

It is an object of this invention to provide a means through which the gangs of a single tandem disk harrow may be operatively associated together and with a draft means and so as to permit of the operation of the gangs of disks to and from angled position as desired, and so as to permit of the automatic release of the means providing for the holding of gangs in angled position upon the turning of the draft means to permit the gangs to move out of angle when negotiating a turn in a direction around the normally open end of the gangs of disks.

Another object of this invention is to provide a means for operatively connecting a pair of gangs of disks of a single tandem disk harrow together so that the gangs of disks may at all times be maintained locked in desired angular relation, and a means for automatically releasing the said connecting means to permit the gangs to negotiate a turn upon the turning of the tractor in the direction around the normally open ends of the gangs of disks.

Other objects and advantages of this invention it is believed will be apparent from the following detailed description of a preferred embodiment thereof as illustrated in the accompanying drawings.

In the drawings:

Figure 1 is a top plan view of the disk harrow embodying our invention illustrating the gangs of disks in parallel or non-operating position.

Figure 2 is a similar top plan view of the disk harrow embodying our invention illustrating the gangs of disks as angled apart to angled or working position and as locked or held permanently in such angled position under conditions of operation.

Figure 3 is a similar top plan view of the disk harrow embodying our invention illustrating the gangs of disks as moved together in the making of a turn in a direction around the normally open ends of the gangs and with the holding or locking means as having been automatically released to permit the negotiation of such a turn.

Figure 4 is a detached fragmental plan view partly in horizontal section of a locking or holding means embodied in our invention.

Figure 5 is an end sectional view taken substantially on the line 5—5 of Figure 4.

In the preferred embodiment of our invention as illustrated in the accompanying drawings, 1 indicates a front gang of disks and 2 a rear gang of disks. The gangs of disks may be of any suitable or desirable construction well known in the art, and such gangs generally include a gang rod 3 upon which concavo-convex disks 4 are mounted, the gang rods being supported in frames 5. The gangs of disks 1 and 2 are connected together by some form of hinge or pivot connection 6 which permits the gangs of disks to swing apart at one end to the working or angled position as is illustrated in Figure 2, or to be moved to the parallel relationship or wheeling position of Figure 1.

In order to operatively connect the disk harrow with a tractor 7 or other similar draft means, a hitch 8 is provided which hitch 8 may be of several different forms of construction and is herein illustrated as including a triangular arrangement of hitch bars 9, 10 and 11 which are pivotally connected at a pivot 12 to the one corner of the frame 5 of the front gang 1 and is connected by an angle bar 13 to the opposite corner of the frame 5 of the rear gang 2, so that as the forward draft is imposed upon the hitch 8 by the forward movement of the tractor or other draft member 7, the hitch 8 will pivot around the pivot 12, pulling this corner of the front gang of disks forward and at the same time pulling the opposite corner of the rear gangs of disks forward to cause the implement to change from the wheeling position of Figure 1 to the angled position of Figure 2.

In order to maintain the disk gangs 1 and 2 in their respective angled or parallel positions, and likewise to permit of the closing of the gangs 1 and 2 together while in motion at the ends of the gangs 1 and 2 which are normally spread apart when in operation upon the turning of the tractor 7 and to permit of this operation being performed automatically without manipulation of the control means by the operator, the following means are preferably provided:

A holding bar 14 is connected between the gangs 1 and 2 so as to permit adjustment of the angularity of the gangs when in working position and to hold the gangs in the adjusted angled position and the holding bar 14 has on its forward end a plurality of lock detents 15 into any one of which the plunger 16 may be urged to secure the forward end of the bar 14 to the frame 5 of the front gang 1. The bar 14 passes through a slide 17 connected to the frame 5 of the rear gang 2 and is provided with a lock detent 18 into which the lock plunger 19 is yieldably urged to normally secure the rear end of the bar 14 to the frame 5 of the rear gang in position to permit pivotal movement of the rear end of the bar 14.

In order to retain the bar 14 in position and to permit its pivoting as is required when the gangs are angled apart or angled together, a pin 20 is passed through the slide 17 and the rear end of the bar 14 may pivot around the pin 20 within the slide 17. The forward end of the bar 14 passes through the yoke 21 through which the bolt 16 projects in passing into any one of the lock detents 15. Secured to the forward and rearward end of the bar 14 are stop pins 22 which act to limit the possible movement of the bar 14 through either the yoke or slide 21 or the slide 17.

The lock plungers 16 and 19 are substantially similar and are operated through the same means and include the plungers 16 or 19 which are yieldably urged into locking position by means of compression springs 23 which operate between shoulders 24 and the end plates 25 of the plunger housings and the ends of the plungers are pivotally secured to pivotally mounted bell crank levers 26 and 27, respectively. The bell crank lever 26 is pivotally mounted on the frame 5 of the front gang 1 and is connected through a rope or flexible operating member 28 which passes through a guide 29 mounted on the frame 5 of the front gang and extends forward to a position where it may be actuated manually by the operator of the tractor. The bell crank lever 27 is pivotally mounted on the frame 5 of the rear gang 2 and is connected through a chain or other suitable flexible operating member 30 with a turning arm 31 which is secured to the frame of the tractor 7 in position offset from the point of attachment of the draw bar 32 of the tractor with the hitch 8 of the disk.

In order to maintain the chain 30 in correct operating position, the same passes over a guide pulley 33 mounted upon the frame 5 of the forward gang 1.

The preferred embodiment of our invention as illustrated in the drawings has preferably the following mode of operation:

When the disk harrow is in position as illustrated in Figure 1 and it is desired to angle the gangs of the harrow to move the same from the position illustrated in Figure 1 to the angled position illustrated in Figure 2, and the tractor 7 is in operation moving forwardly, the operator merely exerts a forward pull upon the rope 28 to pull the latch plunger 16 from within the latch detents 15 permitting the two gangs to spread upon the connecting pivot or hitch 6 to the desired angular relation and the operator may stop the disk gangs in the desired angular relation by releasing the rope 28 to permit the plunger 16 to fall into the desired detent 15, or by retaining a hold upon the rope 28 may permit the gangs to angle to their limit, which is determined by the forward end stop 22 of the holding bar 14.

The gangs of disks are held positively in angular relation when the plunger 16 has fallen into the desired detent 15 so that it is not possible for the gangs to run together under such conditions as when the disk harrow is operating down hill or under other varying soil conditions.

When it is desired to make a right turn or turn around the open ends of the gangs of disks, the operator of the tractor 7 merely operates the tractor in a manner to make a right turn. This operation results in the forward pull being exerted upon the chain 30 to release the latch pin 19 from the detent 18, permitting the holding bar 14 to slide rearwardly through the slide 17 as the gangs 1 and 2 move together from the position indicated in Figure 1 to the position indicated in Figure 3. The force exerted by the turning of the tractor having operated to release the latch at the rear end of the holding bar 14 holds the gangs 1 and 2 in their desired spaced relation and continued forward pull upon the chain 30 by the turning of the tractor may where necessary have resulted in pulling a right-hand end of the rear gang of disks forwardly to close the gangs so that they may properly negotiate a right-hand turn. Upon straightening out the tractor again, the gangs 1 and 2 will assume their angular relation and the latch bolt 19 will again fall in the detent 18 to hold the disk gangs 1 and 2 permanently in their angular relation.

Having fully described our invention, it is to be understood that we do not wish to be limited to the details herein set forth, but our invention is of the full scope of the appended claims.

We claim:

1. In a single tandem disk harrow, the combination of a forward gang of disks and a rearward gang of disks, means pivotally connecting the gangs of disks together, a holding bar connected between the gangs for holding the gangs in angular relation, means at one end of the holding bar operable to determine the angular relation of the gangs as they pivot around the said pivotal connecting means, and a releasable latch means at the other end of the holding bar and releasable to permit the gangs to swing together from angular relation.

2. In a single tandem disk harrow, the combination of a forward gang of disks and a rearward gang of disks, means pivotally connecting the gangs of disks together, a holding bar connected between the gangs for holding the gangs in angular relation, means at one end of the holding bar operable to determine the angular relation of the gangs as they pivot around the said pivotal connecting means, and a releasable latch means at the other end of the holding bar and releasable to permit the gangs to swing together from angular relation, and means operably connecting the latter said releasable connecting means and a draft means for the disk harrow operable automatically upon turning of the tractor to release the latch means.

3. In a single tandem disk harrow, the combination of a front gang of disks and a rear gang of disks, means for pivotally connecting the gangs of disks together so as to permit the gangs to swing to and from angled relation, means connecting the gangs of disks together and operable to hold the gangs of disks in angular relation, and means operably connecting the said holding means with one of the gangs of disks and including means which are releasable to permit the gangs of disks to swing together when it is desired to make a turn, and means connecting the said releasable means and a means utilized for drawing the harrow operable upon turning of the said drawing means to release the said releasable means and permit the gangs to move together from angled relation.

4. In a single tandem disk harrow, the combination of a front gang of disks and a rear gang of disks, means for pivotally connecting the gangs of disks together to permit the gangs to swing to and from angled relation, a hitch for connecting the gangs to a tractor, a connecting bar, adjustable means for adjustably securing a connecting bar to one gang of disks to determine the angularity of the gang of disks, releasable means for securing the connecting bar to the other gang of disks, an arm connected with the tractor, and means connecting the arm and the releasable means and operable upon the turning of the tractor to release the releasable means and permit the gangs of disks to move together on turning of the tractor in a direction to cause the harrow to negotiate a turn around the ends of the gangs which are open when in angular relation.

5. In a single tandem disk harrow, the combination of a forward gang of disks and a rearward gang of disks, means pivotally connecting the gang of disks together to permit the disks to be swung apart to angled position, hitch means connected with the forward gang of disks, a draft means connected with the hitch means, means for holding the gangs in angular relation, the latter means including a latch operatively connected between one of said gangs and the said holding means, and means operatively connected with the draft means and the latch means and operable upon turning of the draft means to release the said latch means to permit said gangs of disks to swing out of angular relation.

6. In a single tandem disk harrow, the combination of a front gang of discs and a rear gang of disks, means pivotally connecting the gangs of disks to permit the gangs to swing apart to angular relation, means for holding the gangs of disks in angular relation, latch means operatively associated with one of said gangs and with the holding means, a hitch secured to the front gang of disks and adapted to be connected with a draft means, and means operatively connected between the draft means and said latch means for releasing the latch means upon turning of the draft means.

7. In a single tandem disk harrow, the combination of a front gang of disks and a rear gang of disks, means pivotally connecting the gangs of disks together to permit the gangs to swing apart to angular relation, a holding bar operatively connected between the gangs, means operatively connected between one of said gangs of disks and the holding bar for determining the angular relation of said gangs of disks as held apart by said holding bar, a latch means operatively connected with the other of said gang of disks and the holding bar, hitch means connected with the front gang of disks and adapted to be connected to a draft means, and means operatively connected between the draft means and the latter said latch means and operative to release the latter said latch means upon turning of the draft means to permit the gangs of disks to swing together out of angled relation.

HOWARD B. RAPP.
RALPH E. ABLOTT.

DISCLAIMER 2,007,062.—*Howard B. Rapp* and *Ralph E. Ablott*, Santa Ana, Calif. DISK HARROW. Patent dated July 2, 1935. Disclaimer filed July 29, 1938, by the assignee, *Towner Manufacturing Company*.

Hereby disclaims claims 3, 5, and 6 of said Letters Patent.

[*Official Gazette September 6, 1938.*]